United States Patent
Yakolev

(10) Patent No.: US 10,768,942 B1
(45) Date of Patent: Sep. 8, 2020

(54) OPTION ROM DISPATCH POLICY CONFIGURATION INTERFACE

(71) Applicant: American Megatrends International, LLC, Norcross, GA (US)

(72) Inventor: Sergiy Yakolev, Johns Creek, GA (US)

(73) Assignee: American Megatrends International, LLC, Norcross, GA (US)

( * ) Notice: Subject to any disclaimer, the term of this patent is extended or adjusted under 35 U.S.C. 154(b) by 441 days.

(21) Appl. No.: 15/582,833

(22) Filed: May 1, 2017

(51) Int. Cl.
*G06F 15/177* (2006.01)
*G06F 9/00* (2006.01)
*G06F 9/4401* (2018.01)
*G06F 3/0482* (2013.01)

(52) U.S. Cl.
CPC ............ *G06F 9/441* (2013.01); *G06F 3/0482* (2013.01)

(58) Field of Classification Search
CPC ................................ G06F 9/441; G06F 3/0482
See application file for complete search history.

(56) References Cited

U.S. PATENT DOCUMENTS

| | | | |
|---|---|---|---|
| 2010/0088501 A1* | 4/2010 | Bramley, Jr. | G06F 9/4401 713/2 |
| 2013/0104188 A1* | 4/2013 | Western | G06F 21/57 726/1 |
| 2017/0201850 A1* | 7/2017 | Raleigh | H04W 4/50 |

* cited by examiner

*Primary Examiner* — Xuxing Chen
(74) *Attorney, Agent, or Firm* — Newport IP, LLC; Leonard J. Hope

(57) ABSTRACT

A computer-implemented method renders user interfaces for devices with multi-image option ROMs according to option ROM dispatch policies associated with the devices. The option ROM dispatch policies can specify whether the multi-image option ROM for the device is enabled or disabled. The option ROM dispatch policies can also specify the image of the multi-image option ROM to execute during boot. The multi-image ROM can include a UEFI compliant image and a legacy BIOS image. The computer-implemented method may receive user selections modifying the option ROM dispatch policies via the rendered user interfaces.

19 Claims, 7 Drawing Sheets

OPTION ROM DISPATCH POLICY CONFIGURATION INTERFACE

BACKGROUND

A computer can include firmware that performs initialization of the computer's hardware during the boot process of the computer. The firmware can also load and perform setup operations for the operating system of the computer. The firmware can be implemented in a read-only memory (ROM) affixed to the motherboard of the computer. A computer can also include, or be attached to, one or more devices such as video cards, network adapters, storage drivers, peripheral interconnect (PCI) devices, universal serial bus (USB) devices. The devices can be on-board devices directly attached to the motherboard. The devices can also be add-on devices that are connected to the motherboard via slots (e.g., a PCI card slot) or connected to the motherboard via a USB port, as just some examples.

Some devices, whether on-board or add-on, include an option (read-only memory) ROM. An option ROM can include computer instructions that are called by the computer system's firmware during boot to handle some device initialization tasks. In some systems, the firmware hands-off execution of the boot process to a device's option ROM to perform execution of initialization tasks for the device, and the option ROM may then hand-off execution of the boot process back to the firmware once initialization tasks for the device are complete. Examples of devices having an option ROM can include video cards, network adapters, and storage drivers for redundant array of inexpensive disks ("RAID") modules.

With the development of the Unified Extensible Firmware Interface ("UEFI") standard, vendors of add-on devices began implementing multi-image option ROMs to support legacy non-UEFI firmware and UEFI compliant firmware. For example, a multi-image option ROM can include two images—a legacy option ROM image and a UEFI compliant option ROM image. A legacy option ROM image can include computer instructions for performing device initialization in computer platforms that are not UEFI complaint, that use Basic Input/Output System ("BIOS") firmware (e.g., a platform using AMIBIOS), or for computing platforms using a combination of non-UEFI compliant and UEFI complaint firmware. In some cases, vendors of on-board devices may also implement multi-image option ROMs including a legacy option ROM image and a UEFI complaint option ROM image. During a boot cycle, the computer firmware should execute only one option ROM per device. Traditionally, the policy for executing one of the images on a multi-image option ROM is implemented in firmware code and configurable in firmware source code, but may not modifiable once the firmware image is created.

It is with respect to these and other considerations that the disclosure made herein is presented.

SUMMARY

Technologies are described herein for providing configurable option ROM dispatch policies for devices and for providing auto generation of user interfaces (e.g., compatibility support module ("CSM") setup pages) for viewing and modifying the configurable option ROM dispatch policies. Through implementations of the disclosed technologies, a user or firmware developer can view, configure, and modify which ROM image (e.g., legacy or UEFI) is executed during boot. As the disclosed technologies provide for configuration of option ROM dispatch policies with no or minimal source code modification, the time for development and testing of computer system firmware can be reduced, and system configurations can be altered without the need for regenerating and/or replacing the firmware image. As the disclosed technologies provide auto generation of user interfaces such as CSM setup pages based on option ROM dispatch policy settings and one or more configurable (and non-compiled) tokens, development and testing time for configuration of option ROM dispatch policies can be significantly reduced and lead to lower errors in the system due to a reduction in overall source code.

In one aspect, the firmware accesses an option ROM dispatch policy setup token comprising a slot list identifying slots supporting add-on devices associated with respective multi-image option ROMs. The firmware also determines an on-board device list by identifying on-board devices associated with respective multi-image option ROMs. The firmware accesses respective option ROM dispatch policies for the slots identified in the slot list and the identified on-board devices.

In some implementations, the option ROM dispatch policy includes an enablement setting indicating whether the firmware executes the respective multi-image option ROM associated with the on-board device or the add-on device during a boot sequence of the computer and a type setting indicating which image of the multi-image option ROM the firmware of the computer executes during the boot sequence of the computer. The firmware may render a main setup user interface including the on-board device list listing the on-board devices and the slot list listing the slots, receive a user selection selecting one of the on-board devices or slots, and render a device setup user interface presenting options for modifying the respective option ROM dispatch policy of the selected one of the on-board devices or slots. The firmware may also detect a user action for changing the option ROM dispatch policy of the selected one of the on-board devices or slots.

In one aspect, the firmware identifies a device connected to the computer system that contains a multi-image option ROM and accesses the option ROM dispatch policy associated with the device. The firmware can execute at least a portion of the multi-image option ROM according to the option ROM dispatch policy during the boot sequence of the computer.

It should be appreciated that the above-described subject matter can also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of the technologies disclosed herein in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for providing configurable option ROM dispatch policies and auto generation of setup pages for modifying option ROM dispatch policies. As discussed briefly above, through an implementation of the technologies disclosed herein, configuration and modification of option ROM dispatch policies for devices having multi-image option ROMs can be done in a simple and efficient manner. These mechanisms can also reduce the time required for development and testing of computer system firmware for computers having devices implementing multi-image option ROMs and, potentially, reduce the number of errors found in the computer. Additional details regarding these aspects will be provided below with regard to FIGS. 1-6.

It should be appreciated that the subject matter presented herein can be implemented as a computer process, a computer-controlled apparatus, a computing system, or an article of manufacture, such as a computer-readable storage medium. While the subject matter described herein is presented in the general context of program modules or components that execute on one or more computing devices, other implementations can be performed in combination with other types of program modules or components. Generally, program modules or components include routines, programs, components, data structures, and other types of structures that perform particular tasks or implement particular abstract data types.

Aspects of the disclosed subject matter described can be practiced on or in conjunction with other computer system configurations beyond disclosed implementations, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like.

In the following detailed description, references are made to the accompanying drawings that form a part hereof, and that show, by way of illustration, specific configurations or examples. The drawings herein are not drawn to scale. Like numerals represent like elements throughout the several figures (which might be referred to herein as a "FIG." or "FIGS.").

Figure 1A:
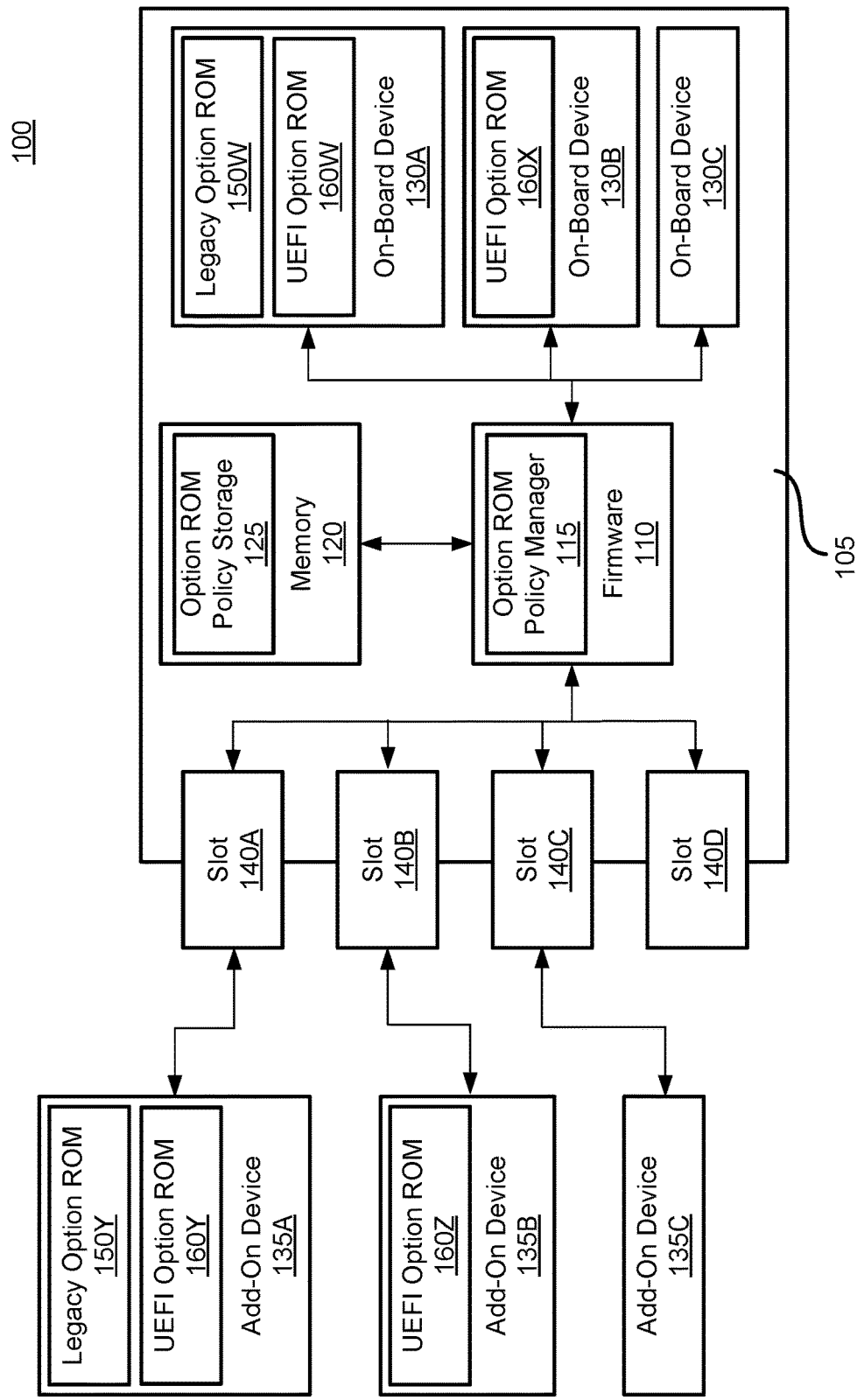
FIGS. 1A and 1B are architecture diagrams illustrating aspects of the operation of a firmware implementing option ROM dispatch policies for computer devices, according to one or more disclosed configurations.

FIG. 1A is an architecture diagram illustrating aspects of the operation of a computer 100 with devices 130, 135 having option ROMs. The computer 100 can include a motherboard 105 having a firmware 110, a memory 120, one or more on-board devices 130 and one or more slots 140. The firmware 110 can include instructions that when executed by a processor (not shown) perform operations for performing hardware and operating system initialization during a boot process of the computer 100.

As shown in FIG. 1A, the motherboard 105 may interface with one or more add-on devices 135 via slots 140. For example, add-on device 135A can interface with the motherboard 105 via slot 140A, add-on device 135B can interface with the motherboard 105 via slot 140B, and add-on device 135C can interface with the motherboard 105 via slot 140C. Some slots 140 may be empty in some configurations. For example, slot 140D is empty in the example configuration of FIG. 1A. The slots 140 may be peripheral component interconnect (PCI) slots and the add-on devices 135 may be PCI devices, for example.

According to some implementations, devices 130, 135 can include an option ROM image. As shown in FIG. 1A, some devices include a multi-image option ROM having more than one option ROM image. Consistent with disclosed configurations, a multi-image ROM can support legacy non-UEFI BIOS firmware or UEFI complaint firmware. For example, on-board device 130A has a multi-image option ROM having a first image of legacy option ROM 150W and a second image of UEFI Option ROM 160W. Likewise, add-on device 135A has a multi-image option ROM having a first image of legacy option ROM 150Y and second image of UEFI Option ROM 160Y. Likewise, some devices include a single option ROM image. For example, on-board device 130B includes UEFI option ROM 160X and no legacy option ROM, and add-on device 135B includes UEFI option ROM 160Z and no legacy option ROM. And, in some configurations, devices 130, 135 may not include an option ROM, such as on-board device 130C and add-on device 135C.

In some configurations, the firmware 110 can include an option ROM policy manager 115. The option ROM policy manager 115 can perform functions and operations consistent with disclosed configurations including accessing option ROM policy storage 125 to obtain option ROM dispatch policies for devices 130, 135 and executing a boot process of the computer 100 consistent with the obtained option ROM dispatch policies. The option ROM policy manager 115 can also perform functions and operations for generating user interfaces for configuring, viewing, and/or modifying option ROM dispatch policies, such as the user interface illustrated in FIG. 4. According to some configurations, the option ROM policy manager 115 can perform the routines described below with respect to FIGS. 2 and 3, for example.

The memory 120 can include, in some configurations, a complementary metal-oxide semiconductor (CMOS) such as an on-board, battery powered semiconductor chip storing system time and date information and system hardware settings for the computer 100. In some configurations, the memory 120 can include flash memory. In some configurations, the memory 120 can include an option ROM policy storage 125. The option ROM policy storage 125 can include a table, index, or database storing option ROM dispatch policies for the devices 130, 135 of the computer 100. An option ROM dispatch policy for a device 130, 135 can include the policy by which the option ROM policy manager executes the option ROM 150, 160 of the device.

In some configurations, the option ROM dispatch policy includes an enablement setting or flag indicating whether the option ROM policy manager 115 executes the option ROM 150, 160 of the device 130, 135 upon boot. When the enablement setting is set to "Enabled" (e.g., 1 or TRUE), then the option ROM policy manager 115 will execute the option ROM 150, 160 of the device 130, 135 during the boot process of the computer 100. When the enablement setting is set to "Disabled" (e.g., 0 or FALSE), then the option ROM policy manager 115 will not execute the option ROM 150, 160 of the device 130, 135 during the boot process of the computer 100.

In some configurations, the option ROM dispatch policies stored in option ROM policy storage 125 includes a type setting or flag indicating which image (e.g., legacy or UEFI) of a multi-image option ROM the option ROM policy manager 115 should execute for a device upon boot. For example, the option ROM dispatch policy for on-board device 130A may include a type setting indicating that either legacy option ROM 150W or UEFI option ROM 160W should execute during the boot process of the computer 100.

The option ROM dispatch policy may correspond to a slot 140 in which a device 135 interfaces with the motherboard 105. For example, slot 140A may have an option ROM dispatch policy with an enablement setting of "Enabled" and a type setting of "Legacy."

In some configurations, devices 130, 135 may be part of a device group and the option ROM dispatch policy may be associated with the device group as opposed to the individual devices within the group. In such configurations, the option ROM policy manager 115 will determine the option ROM dispatch policy for a device based on the option ROM dispatch policy assigned to the group to which the device belongs. For example, if on-board device 130A and add-on device 135A are both devices part of a network device group (e.g., because they are devices handling network communications) and the option ROM policy storage 125 stores an option ROM dispatch policy for the network device group including an enablement setting of "Enabled" and a type setting of "UEFI," the option ROM policy manager 115 will enable and execute UEFI Option ROM 160W (for on-board device 130A) and UEFI Option ROM 160Y (for add-on device 135A) during the boot process of the computer 100.

When a device is part of a device group, it may have an option ROM dispatch policy that overrides the option ROM dispatch policy of its device group. For example, on-board device 130A and add-on device 135A may be both devices part of a mass storage device group (e.g., because they may both be mass storage devices). The option ROM policy storage 125 may store an option ROM dispatch policy for the mass storage device group including an enablement setting of "Enabled" and a type setting of "UEFI."

While add-on device 135A may be part of the mass storage device group, it may have its own option ROM dispatch policy including an enablement setting of "Enabled" and a type setting of "Legacy." In such an example, the option ROM policy manager 115 may enable and execute UEFI option ROM 160W for on-board device 130A based on the option ROM dispatch policy for the mass storage group and legacy option ROM 150Y for add-on device 135A based on the option ROM dispatch policy for add-on device 135A during the boot process of the computer 100. In some configurations, if a device 130, 135 has an option ROM dispatch policy defined it will override the device group option ROM dispatch policy for the device. In some configurations, users or developers can manually set whether a device uses the option ROM dispatch policy for the device of its device group.

Figure 4:
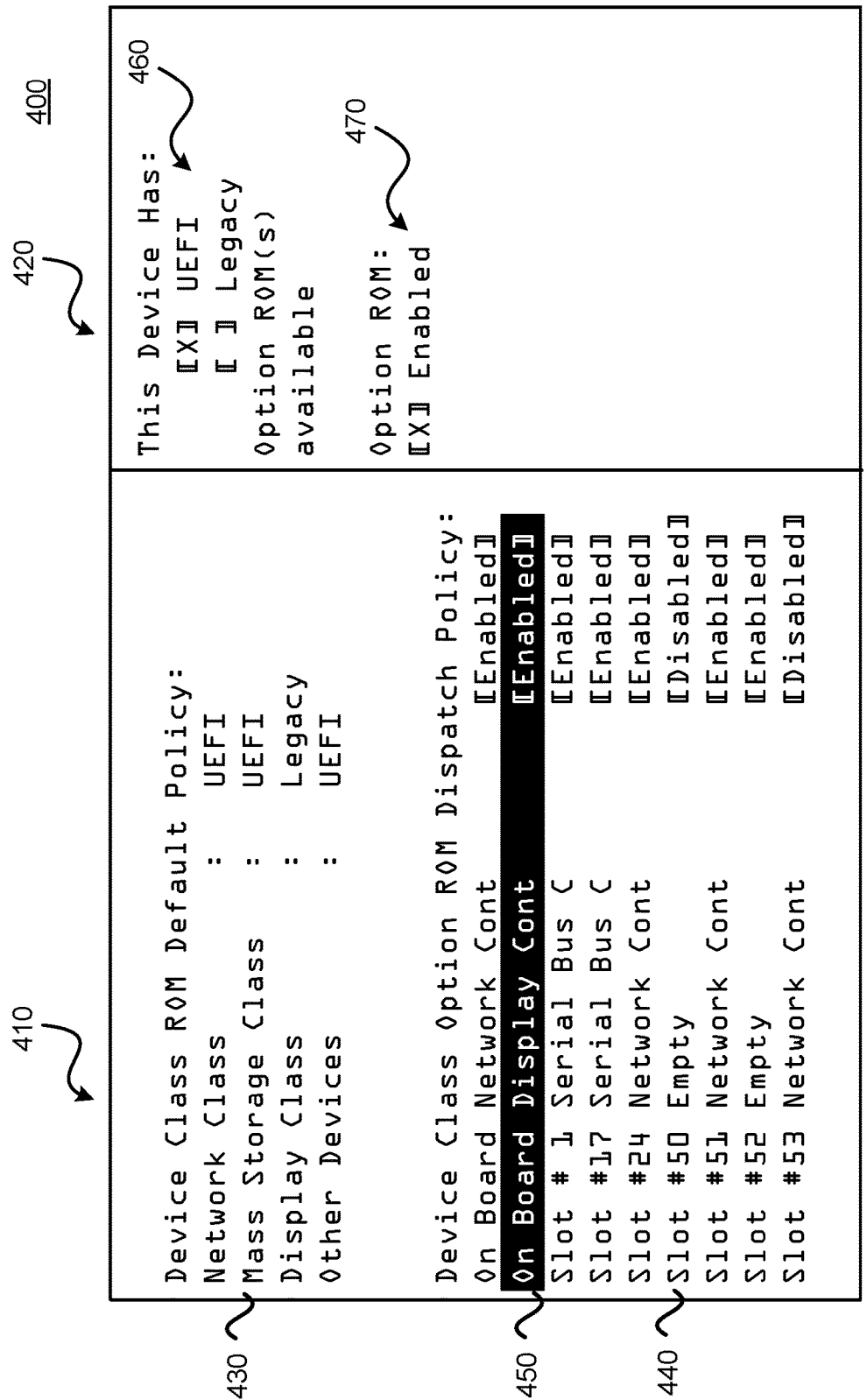
FIG. 4 is a user interface diagram illustrating aspects of an example user interface consistent with disclosed configurations.

In some configurations, the option ROM policy manager 115 may perform functions and operations to generate a user interface for configuring the option ROM dispatch policies of devices 130, 135. The user interface can include, for example, a CMS setup page, or a portion of a CMS setup page. One example of a user interface generated by option ROM policy manager 115 is shown in FIG. 4, described in more detail below. The option ROM policy manager 115 may access the option ROM policy storage 125 to obtain information for automatically generating the setup pages.

In some configurations, the option ROM policy manager 115 accesses an option ROM dispatch policy setup token which contains information concerning the slots 140 that can be configured to support add-on devices 135 having an option ROM. The option ROM policy manger 115 may access the token from option ROM policy storage 125 in some configurations. The token can be, for example, a token as defined in AMERICAN MEGATRENDS's ("AMI") System Definition Language (SDL). One example of an AMI SDL token is below:

TOKEN
    Name="ROM_SETUP_SLOTS_TO_SHOW"
    Value="1,17,24,50,51,52,53"
    Help="List of Slot Numbers to be shown in Option ROM Dispatch Policy Setup Screen."
    TokenType=Expression
    TargetH=Yes
End In the example token above, slots 1, 17, 24, 50, 51, 52, and 53 of the motherboard 105 can be configured to support option ROM for an add-on device. Using the token, the option ROM policy manager 115 can determine which slots should be listed in a user interface for configuring option ROM dispatch policies.

By using the token, the option ROM policy manager 115 can generate CMS setup pages for the add-on device 135 dynamically based on the information within the token. Without the token, or the option ROM dispatch policies, developers would need to write code for a setup page for each slot supporting add-on devices with option ROM, which may vary from platform to platform. The use of the option ROM policy manager 115 can, for example, speed development and reduce potential for introducing defects in the firmware code base by alleviating the need to code setup pages for each configuration of the motherboard 105.

The option ROM policy manager 115 may also access the memory 120 or the option ROM policy storage 125 to determine which on-board devices 130 have an option ROM, and may use this information to dynamically generate CMS setup pages. For example, in the configuration shown in FIGS. 1A and 1B, the option ROM policy manager 115 may identify that on-board device 130A and on-board device 130B have option ROMs and the option ROM policy manager 115 may generate setup pages for enabling or disabling their option ROMs. And, the option ROM policy manager 115 may identify on-board device 130A as a device with a multi-image option ROM and may also generate a setup page to set the type setting (e.g., "UEFI" or "Legacy") for the option ROM dispatch policy for on-board device 130A.

Figure 1B:
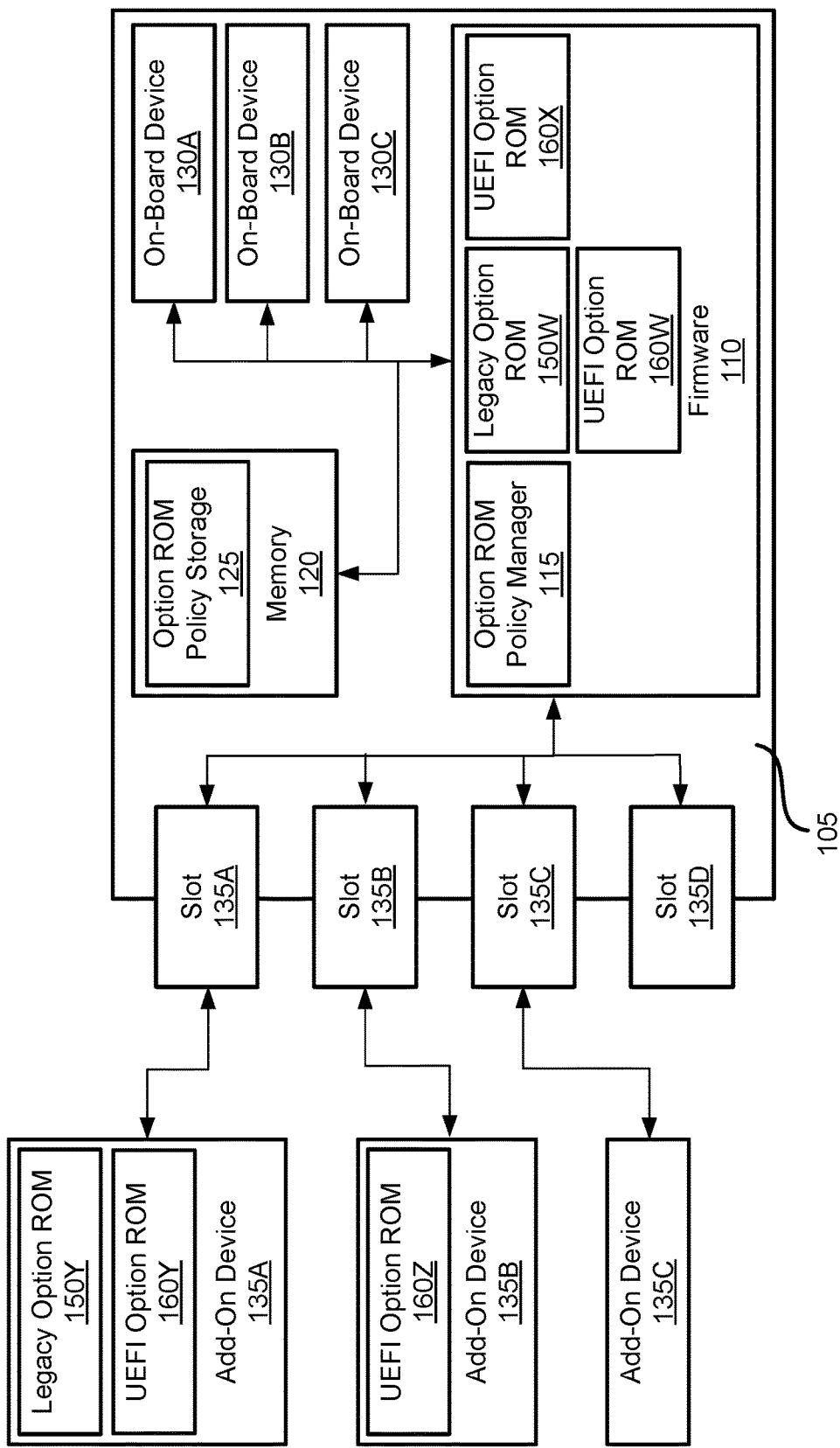

In some configurations, the option ROMs for on-board devices 130 may be part of the firmware 110 instead of being part of on-board devices 130. FIG. 1B shows one example of a configuration with option ROMs located within the firmware 110. As shown in FIG. 1B, legacy option ROM 150W and UEFI Option ROM 160W (for on-board device 130A) is part of firmware 110 and UEFI option ROM 160X (for on-board device 130B) is part of firmware 110. While the option ROMs of the on-board devices 130 are in a different location configurations FIG. 1A and FIG. 1B, the functionality an operations of option ROM policy manager 115 may not vary between the configurations.

Figure 2:
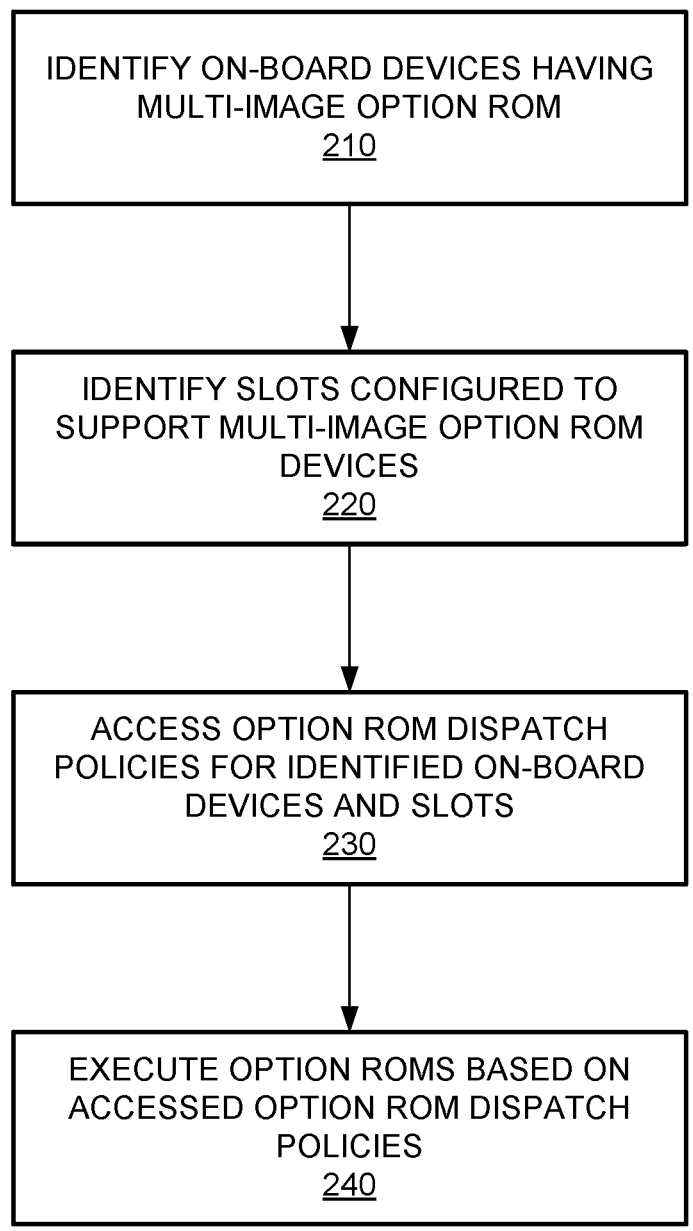
FIG. 2 is a flow diagram showing a routine that illustrates additional aspects of the operation of the firmware shown in FIGS. 1A and 1B, according to one or more disclosed configurations.

FIG. 2 is a flow diagram showing a routine 200 for a boot process implementing option ROM dispatch policies, according to disclosed configurations. It should be appreciated that the logical operations described herein with respect to FIG. 2, and the other FIGS., can be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. and described herein. These operations can also be performed in parallel, or in a different order than those described herein. Some or all of these operations can also be performed by components other than those specifically identified.

The routine 200 begins at operation 210 where on-board devices having a multi-image option ROM are identified. The on-board devices may be identified using the firmware 110, by accessing the option ROM policy storage 125, or by polling the on-board devices during the boot sequence. The routine 200 continues to operation 220 where the slots configured to support add-on devices having a multi-image option ROM are identified. As mentioned above, the slots may be identified by accessing option ROM policy storage 125 which may store the identification of the slots in a database or table, or the option ROM policy storage 125 may store an AMI SDL token including the identification of the slots.

At operation 230, the option ROM dispatch policies for the identified on-board devices (at operation 210) and the slots (at operation 220) are accessed to determine the respective option ROM dispatch policies for each on-board device or slot. The option ROM dispatch policies can include an enablement setting for determining whether the option ROM for the on-board or add-on device should be enabled (e.g., executed during boot). The option ROM dispatch policies can also include a type setting indicating which image of the multi-image option ROM should be executed during the boot sequence.

Once the option ROM dispatch policies have been accessed, the routine 200 continues to operation 240 where the option ROMs of the on-board devices and the add-on devices are executed based on the option ROM dispatch policies, consistent with disclosed configurations.

Figure 3:
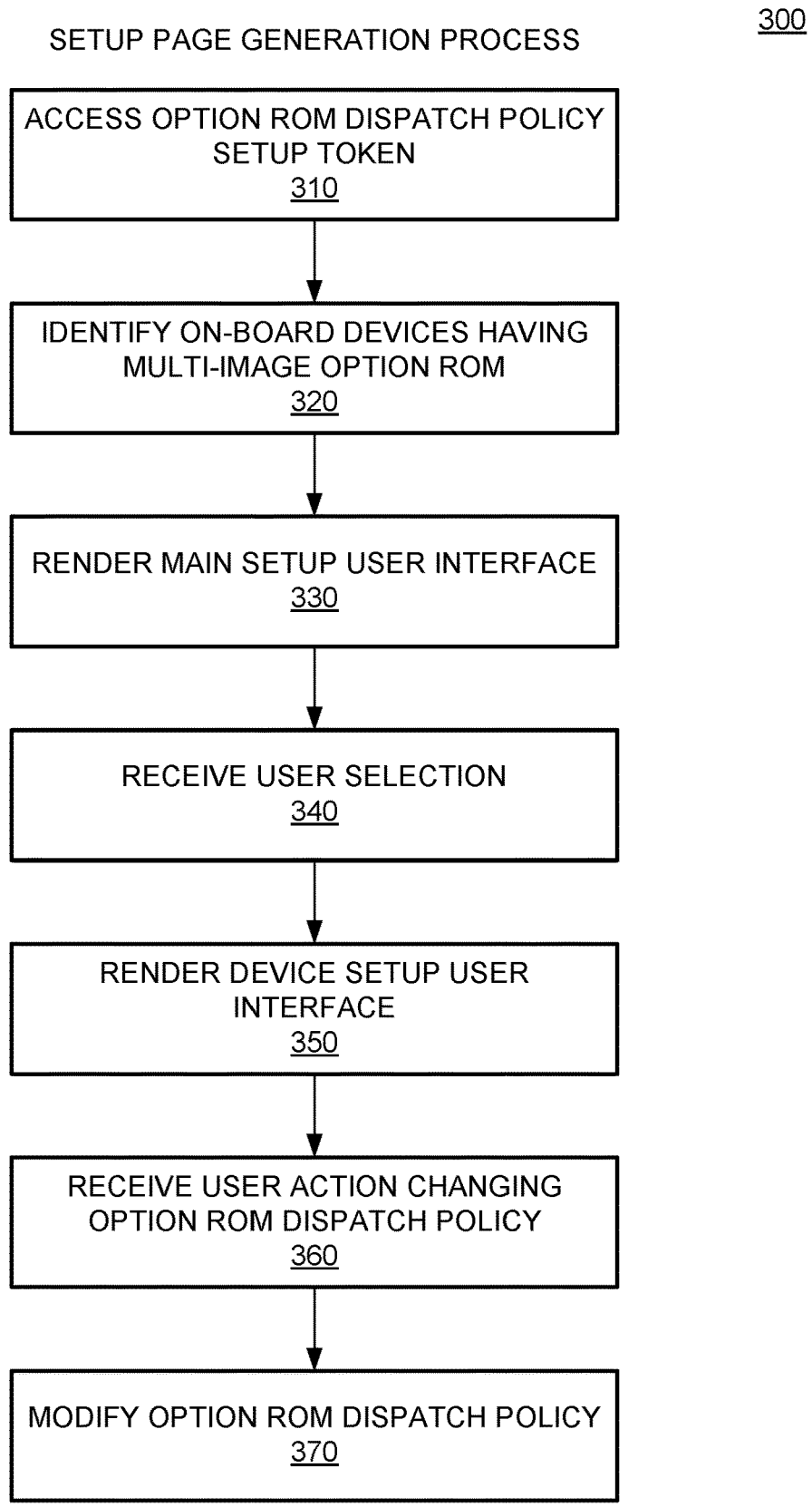
FIG. 3 is a flow diagram showing a routine that illustrates additional aspects of the operation of the firmware shown in FIGS. 1A and 1B, according to one or more disclosed configurations.

FIG. 3 is a flow diagram showing a routine 300 illustrating a process for generating setup pages for configuration and modification of option ROM dispatch policies, consistent with disclosed configurations. In some configurations, routine 300 can be performed by the option ROM policy manager 115.

The routine 300 begins at operation 310, where the option ROM policy manager 115 accesses an option ROM dispatch policy setup token. The setup token can include the identification of slots which can be configured to support add-on devices with option ROMs, including multi-image ROMs. In some configurations, the token is written in AMI SDL, as indicated above.

At operation 320, the option ROM policy manager 115 identifies the on-board devices having a multi-image option ROM. The option ROM policy manager 115 may identify the on-board devices with a multi-image option ROM based on firmware code, polling each add-on device, or a from accessing the option ROM policy storage 125. In some configurations, the option ROM policy manager 115 identifies the on-board devices with multi-image option ROMs based on a token, similar to the token used by how the option ROM policy manager 115 to identify the slots supporting add-on devices with multi-image option ROMs.

At operation 330, the option ROM policy manager 115 renders a main setup user interface. The main setup user interface can be a CSM setup page, or be part of a CSM setup page. The main setup user interface can display the list of slots supporting add-on devices with multi-image option ROMs (identified as part of operation 310) and the on-board devices having a multi-image option ROM (identified as part of operation 320). In some configurations, the main setup user interface can include a description of the on-board device or add-on device attached the computer at the listed slot. The main setup page may also show whether the option ROM for the add-on device or on-board device is enabled or disabled.

In some configurations, the main setup user interface can be responsive to user input. For example, a user may highlight one of the slots or on-board devices using keyboard, and may select one of the slots or on-board devices by performing a user action when a selected slot or on-board device is highlighted. The user action can include, for example, depressing a key on a keyboard, such as "Enter" for example. When a user performs the user action, the option ROM policy manager 115 may receive the user selection indicating the selected slot or on-board device at operation 340.

The option ROM policy manager 115 continues execution of the routine 300 at operation 350 where it renders device setup user interface for the on-board device or slot selected in operation 340. The device setup user interface can include details of the option ROM dispatch policy for the on-board device or slot selected in operation 340. For example, the device setup user interface can display the current enablement setting (e.g., "Enabled" or "Disabled") and/or the current type setting (e.g., "Legacy" of "UEFI") for the selected on-board device or slot.

In some configurations, the device setup user interface can be responsive to user input and actions, and the user input or actions can be used to modify the option ROM dispatch policy for the selected on-board device or slot. For example, the device setup user interface may responsive to user keystrokes such as arrow up or down keystrokes or enter keystrokes. The option ROM policy manager 115 may receive a user action for changing the option ROM dispatch policy of the selected on-board device or slot at operation 360. For example, a user action may indicate changing the type setting of the option ROM dispatch policy from "UEFI" to "Legacy."

Once the option ROM policy manager 115 receives the user action at operation 360, it may perform operation 370 where it modifies the option ROM dispatch policy for the selected on-board device or slot. In some configurations, the option ROM policy manager 115 modifies the option ROM dispatch policy for the selected on-board device or slot by writing the value indicated by the user action to the option ROM policy storage 125.

FIG. 4 shows an example setup page 400 consistent with disclosed configurations. The setup page 400 includes a main setup user interface 410 and a device setup user interface 420. The main setup user interface 410 can include a device group list 430 showing the option ROM dispatch policies currently defined for device groups and their current type settings. For example, the example setup page 400, option ROM dispatch policies are defined for network class devices, mass storage class devices, display class devices, and other devices, with the type setting set to UEFI, UEFI, Legacy, and UEFI respectively.

As discussed above, the option ROM dispatch policies for the device groups can serve as a default for devices that are part of the devices groups in the event there is no option ROM dispatch policy defined for a particular device within the device group. For example, if a network device with a multi-image option ROM does not have a device specific option ROM dispatch policy, then the option ROM policy manager will launch the UEFI image of the multi-image option ROM consistent with the option ROM dispatch policy for the network class device group.

The main setup user interface 410 may also include a device list 440 which lists the on-board devices having a multi-image option ROM ("On Board Network Cont" and "On Board Display Cont") and the slots (1, 17, 24, 50, 51, 52, 53) configured to support add-on devices having an multi-image option ROM. In some configurations, such as the example setup page 400, the device list 440 can include the current enablement setting value of the displayed on-board devices and slots. As shown in FIG. 4, the device list can also include a brief description of the on-board devices with multi-image option ROMs or the add-on devices connected to the slots supporting add-on devices having multi-image option ROMs. The device list may also indicate whether a slot supporting an add-on device having a multi-image option ROM is empty (such as slots 50 and 52 as shown in FIG. 4).

The device setup user interface 420 may populate responsive to a user action indicating selection of a device in device list 440. For example, as shown in FIG. 4, a user selection 450 of the "On Board Display Cont" can trigger display of the device setup user interface for the "On Board Display Cont" device. The device setup user interface 420 can include a type selector 460, providing a user interface for a user to view and modify the type setting of the option ROM dispatch policy for the device selected in the device list 440. The device setup user interface 420 may also include an enablement selector 470, providing a user interface for a user to view and modify the enablement setting of the option ROM dispatch policy for dispatch policy for the device selected in the device list 440.

Figure 5:
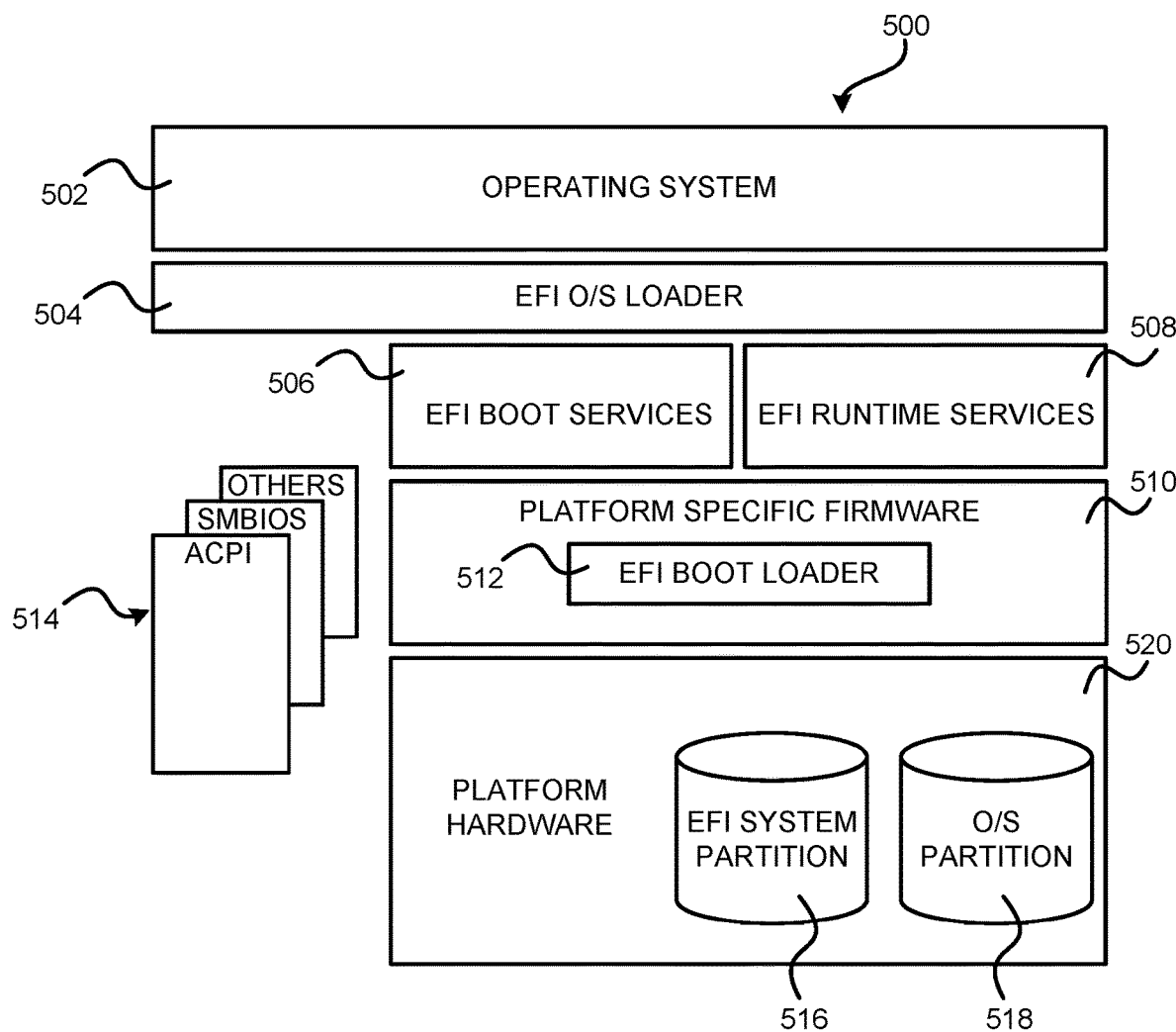
FIG. 5 is a software architecture diagram illustrating a software architecture for a Unified Extensible Firmware Interface ("UEFI") Specification-compliant firmware that provides an operating environment for the technologies presented herein in one particular configuration.

Turning now to FIG. 5, a software architecture diagram will be described that illustrates an architecture for a UEFI Specification-compliant firmware that can be created using the technologies disclosed herein. The UEFI Specification describes an interface between an operating system 502 and a UEFI Specification-compliant firmware. The UEFI Specification also defines an interface that the firmware can implement, and an interface that the operating system 502 can use while booting. How the firmware implements the interface can be left up to the manufacturer of the firmware. The UEFI Specification also defines a way for the operating system 502 and firmware to exchange information necessary to support the operating system boot process. The term "UEFI Specification" used herein refers to both the EFI Specification developed by INTEL CORPORATION and the UEFI Specification managed by the UEFI FORUM.

As shown in FIG. 5, the architecture can include platform hardware 520 and an operating system 502. The operating system ("OS" or "O/S") image can be retrieved from the UEFI system partition 516 using an UEFI operating system loader 504. The UEFI system partition 516 can be an architecturally shareable system partition. As such, the UEFI system partition 516 can define a partition and file system designed to support safe sharing of mass storage between multiple vendors. An OS partition 518 can also be utilized.

Once started, the UEFI OS loader 504 can continue to boot the complete operating system 502. In doing so, the UEFI OS loader 504 can use UEFI boot services 506, an interface to other supported specifications to survey, comprehend, and initialize the various platform components and the operating system software that manages them. Thus, interfaces 514 from other specifications can also be present on the system. For example, the Advanced Configuration and Power Management Interface ("ACPI") and the System Management BIOS ("SMBIOS") specifications can be supported.

UEFI boot services 506 can provide interfaces for devices and system functionality used during boot time. UEFI runtime services 508 can also be available to the UEFI OS loader 504 during the boot phase. For example, a set of runtime services can be presented to ensure appropriate abstraction of base platform hardware resources used by the operating system 502 during its operation. UEFI allows extension of platform firmware by loading UEFI driver and UEFI application images which, when loaded, have access to UEFI-defined runtime and boot services.

Additional details regarding the operation and architecture of a UEFI Specification compliant firmware can be found in the UEFI Specification which is available from INTEL CORPORATION. INTEL CORPORATION has also provided further details regarding recommended implementation of EFI and UEFI in the form of The INTEL Platform Innovation Framework for EFI ("the Framework"). Unlike the UEFI Specification, which focuses only on programmatic interfaces for the interactions between the operating system and system firmware, the Framework is a group of specifications that together describe a firmware implementation that has been designed to perform the full range of operations that are required to initialize the platform from power on through transfer of control to the operating system. Both the UEFI Specification and the specifications that make up the Framework, which are also available from INTEL CORPORATION, are expressly incorporated herein by reference.

Figure 6:
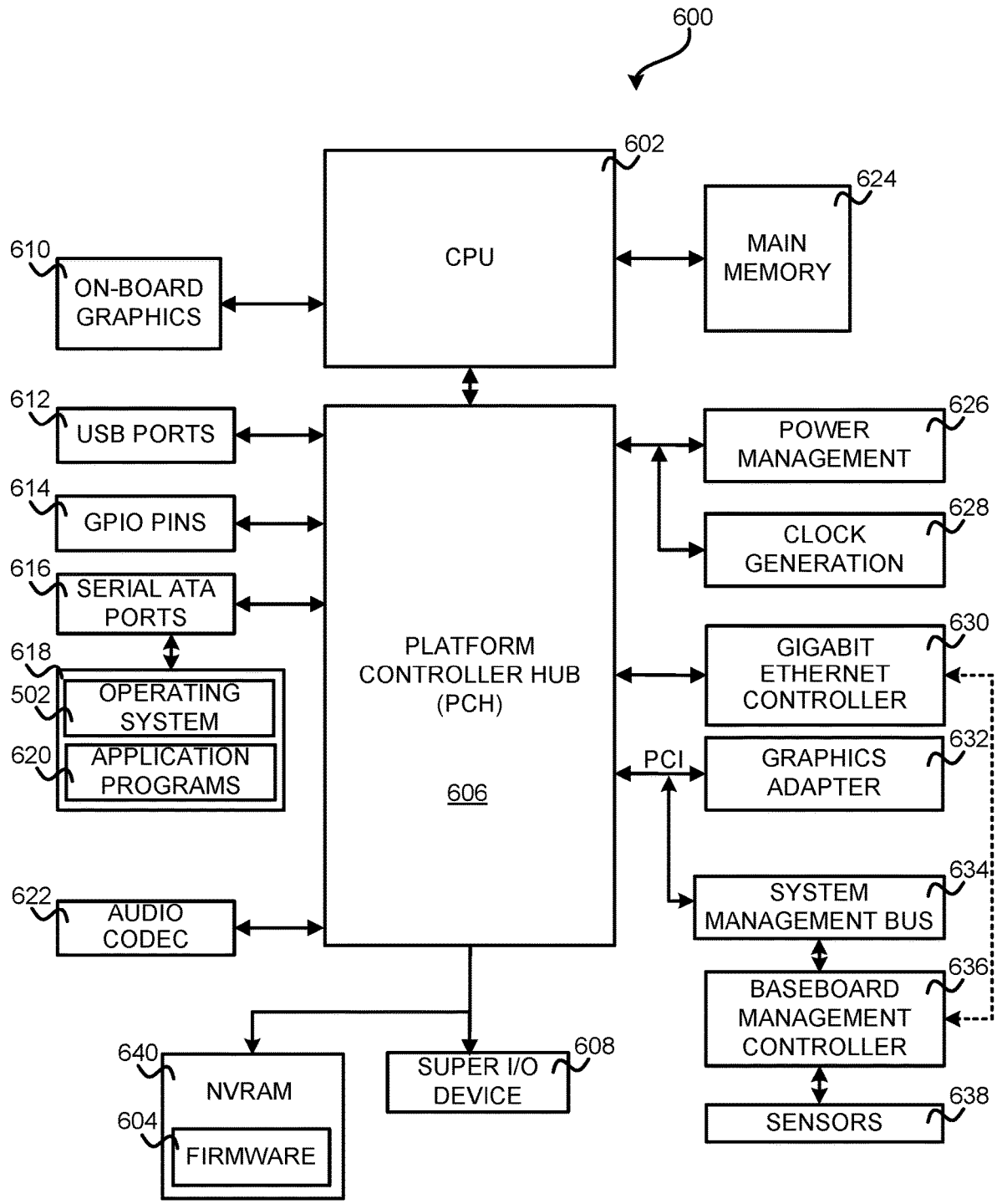
FIG. 6 is a computer architecture diagram that shows an illustrative architecture for a computer that can provide an operating environment for disclosed technologies.

Referring now to FIG. 6, a computer architecture diagram that illustrates an illustrative architecture for a computer that can provide an illustrative operative environment for the technologies presented herein will be described. FIG. 6 and the following discussion are intended to provide a brief, general description of a suitable computing environment in which the configurations described herein can be implemented. While the technical details are presented herein in the general context of program modules that execute in conjunction with the execution of an operating system, those skilled in the art will recognize that the configurations can also be implemented in combination with other program modules.

Generally, program modules include routines, programs, components, data structures, and other types of structures that perform particular tasks or implement particular abstract data types. Moreover, those skilled in the art will appreciate that the configurations described herein can be practiced with other computer system configurations, including handheld devices, multiprocessor systems, microprocessor-based or programmable consumer electronics, minicomputers, mainframe computers, and the like. The configurations described herein can also be practiced in distributed computing environments where tasks are performed by remote processing devices that are linked through a communications network. In a distributed computing environment, program modules can be located in both local and remote memory storage devices.

In particular, FIG. 6 shows an illustrative computer architecture for a computer 600 that can be utilized in the implementations described herein. The illustrative computer architecture shown in FIG. 6 is for the computer 600 that includes a baseboard, or "motherboard", which is a printed circuit board to which a multitude of components or devices can be connected by way of a system bus or other electrical communication path. In one illustrative configuration, a central processing unit ("CPU") 602 operates in conjunction with a Platform Controller Hub ("PCH") 606. The CPU 602 is a central processor that performs arithmetic and logical operations necessary for the operation of the computer 600. The computer 600 can include a multitude of CPUs 602. Each CPU 602 might include multiple processing cores.

The CPU 602 provides an interface to a random access memory ("RAM") used as the main memory 624 in the computer 600 and, possibly, to an on-board graphics adapter 632. The PCH 606 provides an interface between the CPU 602 and the remainder of the computer 600.

The PCH 606 can also be responsible for controlling many of the input/output functions of the computer 600. In particular, the PCH 606 can provide one or more universal serial bus ("USB") ports 612, an audio codec 622, a Gigabit Ethernet Controller 630, and one or more general purpose input/output ("GPIO") pins 614. The USB ports 612 can include USB 2.0 ports, USB 3.0 ports and USB 3.1 ports among other USB ports. The audio codec 622 can include Intel High Definition Audio, Audio Codec '97 ("AC' 97") and Dolby TrueHD among others.

The PCH 606 can also include functionality for providing networking functionality through a Gigabit Ethernet Controller 630. The Gigabit Ethernet Controller 630 is capable of connecting the computer 600 to another computer via a network. Connections which can be made by the Gigabit Ethernet Controller 630 can include LAN or WAN connections. LAN and WAN networking environments are commonplace in offices, enterprise-wide computer networks, intranets, and the Internet.

The PCH 606 can also provide a bus for interfacing peripheral card devices such as a graphics adapter 632. In one configuration, the bus comprises a PCI bus. The PCI bus can include a Peripheral Component Interconnect ("PCI") bus, a Peripheral Component Interconnect eXtended ("PCI-X") bus and a Peripheral Component Interconnect Express ("PCIe") bus among others.

The PCH 606 can also provide a system management bus 634 for use in managing the various components of the computer 600. Additional details regarding the operation of the system management bus 634 and its connected components are provided below. Power management circuitry 626 and clock generation circuitry 628 can also be utilized during the operation of the PCH 606.

The PCH 606 is also configured to provide one or more interfaces for connecting mass storage devices to the computer 600. For instance, according to a configuration, the PCH 606 includes a serial advanced technology attachment ("SATA") adapter for providing one or more serial ATA ports 616. The serial ATA ports 616 can be connected to one or more mass storage devices storing an OS, such as OS 502 and application programs, such as a SATA disk drive 618. As known to those skilled in the art, an OS comprises a set of programs that control operations of a computer and allocation of resources. An application program is software that runs on top of the operating system software 502, or other runtime environment, and uses computer resources to perform application specific tasks desired by the user.

According to one configuration, the OS 502 comprises the LINUX operating system. According to another configuration, the OS 502 comprises the WINDOWS operating system from MICROSOFT CORPORATION. According to another configuration, the OS 502 comprises the UNIX operating system. It should be appreciated that other operating systems can also be utilized.

The mass storage devices connected to the PCH 606, and their associated computer-readable storage media, provide non-volatile storage for the computer 600. Although the description of computer-readable storage media contained herein refers to a mass storage device, such as a hard disk or CD-ROM drive, it should be appreciated by those skilled in the art that computer-readable storage media can be any available media that can be accessed by the computer 600.

By way of example, and not limitation, computer-readable storage media can comprise computer storage media and communication media. Computer storage media includes volatile and non-volatile, removable and non-removable media implemented in any method or technology for storage of information such as computer-readable instructions, data structures, program modules or other data. However, computer-readable storage media does not encompass transitory signals. Computer storage media includes, but is not limited to, RAM, ROM, EPROM, EEPROM, flash memory or other solid state memory technology, CD-ROM, DVD, HD-DVD, BLU-RAY, or other optical storage, magnetic cassettes, magnetic tape, magnetic disk storage or other magnetic storage devices, or any other medium which can be used to store the desired information and which can be accessed by the computer 600.

A low pin count ("LPC") interface can also be provided by the PCH 606 for connecting a Super I/O device 608. The Super I/O device 608 is responsible for providing a number of input/output ports, including a keyboard port, a mouse port, a serial interface, a parallel port, and other types of input/output ports. The LPC interface can also connect a computer storage media such as a ROM or a flash memory such as a NVRAM 640 for storing firmware 604 that includes program code containing the basic routines that help to start up the computer 600 and to transfer information between elements within the computer 600. The firmware 604 can be a multi-platform firmware, i.e., a firmware having more than one firmware image.

It should be appreciated that the program modules disclosed herein, including the firmware 604, can include software instructions that, when loaded into the CPU 602 and executed, transform a general-purpose computer 600 into a special-purpose computer 600 customized to facilitate all, or part of, the operations disclosed herein. As detailed throughout this description, the program modules can provide various tools or techniques by which the computer 600 can participate within the overall systems or operating environments using the components, logic flows, and/or data structures discussed herein.

The CPU 602 can be constructed from any number of transistors or other circuit elements, which can individually or collectively assume any number of states. More specifically, the CPU 602 can operate as a state machine or finite-state machine. Such a machine can be transformed to a second machine, or a specific machine, by loading executable instructions contained within the program modules. These computer-executable instructions can transform the CPU 602 by specifying how the CPU 602 transitions between states, thereby transforming the transistors or other circuit elements constituting the CPU 602 from a first machine to a second machine, wherein the second machine can be specifically configured to perform the operations disclosed herein. The states of either machine can also be transformed by receiving input from one or more user input devices, network interfaces (such as the Gigabit Ethernet Controller 630), other peripherals, other interfaces, or one or more users or other actors. Either machine can also transform states, or various physical characteristics of various output devices such as printers, speakers, video displays, or otherwise.

Encoding the program modules can also transform the physical structure of the storage media. The specific transformation of physical structure can depend on various factors, in different implementations of this description. Examples of such factors can include, but are not limited to: the technology used to implement the storage media, whether the storage media are characterized as primary or secondary storage, and the like. For example, if the storage media are implemented as semiconductor-based memory, the program modules can transform the physical state of the semiconductor main memory 624 and/or NVRAM 640. For example, the software can transform the state of transistors, capacitors, or other discrete circuit elements constituting the semiconductor memory.

As another example, the storage media can be implemented using magnetic or optical technology such as hard drives or optical drives. In such implementations, the program modules can transform the physical state of magnetic or optical media, when the software is encoded therein. These transformations can include altering the magnetic characteristics of particular locations within given magnetic media. These transformations can also include altering the physical features or characteristics of particular locations within given optical media to change the optical characteristics of those locations. It should be appreciated that various other transformations of physical media are possible without departing from the scope and spirit of the present description.

As described briefly above, the PCH 606 can include a system management bus 634. The system management bus 634 can include a Baseboard Management Controller ("BMC") 636. In general, the BMC 636 is a microcontroller that monitors operation of the computer 600. In a more specific configuration, the BMC 636 monitors health-related aspects associated with the computer 600, such as, but not limited to, the temperature of one or more components of the computer 600, speed of rotational components (e.g., spindle motor, CPU fan, etc.) within the computer 600, the voltage across or applied to one or more components within the computer 600, and the available and/or used capacity of memory devices within the computer 600. To accomplish these monitoring functions, the BMC 636 is communicatively connected to one or more components by way of the system management bus 634.

In one configuration, these components include sensor devices 638 for measuring various operating and performance-related parameters within the computer 600. The sensor devices 638 can be either hardware or software based components configured or programmed to measure or detect one or more of the various operating and performance-related parameters.

The BMC 636 functions as the master on the system management bus 634 in most circumstances, but can also function as either a master or a slave in other circumstances. Each of the various components communicatively connected to the BMC 636 by way of the system management bus 634 is addressed using a slave address. The system management bus 634 is used by the BMC 636 to request and/or receive various operating and performance-related parameters from one or more components, which are also communicatively connected to the system management bus 634.

It should be appreciated that the functionality provided by the computer 600 can be provided by other types of computing devices, including hand-held computers, embedded computer systems, personal digital assistants, and other types of computing devices known to those skilled in the art. It is also contemplated that the computer 600 might not include all of the components shown in FIG. 6, can include other components that are not explicitly shown in FIG. 6, or might utilize an architecture completely different than that shown in FIG. 6.

Based on the foregoing, it should be appreciated that technologies for implementing option ROM dispatch policy support have been disclosed herein. Although the subject matter presented herein has been described in language specific to computer structural features, methodological acts, and computer readable media, it is to be understood that the present invention is not necessarily limited to the specific features, acts, or media described herein. Rather, the specific features, acts and mediums are disclosed as example forms.

The subject matter described above is provided by way of illustration only and should not be construed as limiting. Various modifications and changes can be made to the subject matter described herein without following the example configurations and applications illustrated and described, and without departing from the true spirit and scope of the present invention.

What is claimed is:

1. A computer-implemented method, comprising:
   identifying a device connected to a computer system, the device containing a multi-image option read-only memory (ROM);
   accessing an option ROM dispatch policy associated with the device, the option ROM dispatch policy comprising:
      an enablement setting indicating whether firmware of a computer executes the multi-image option ROM of the device during a boot sequence of the computer, and
      a type setting indicating an image of the multi-image option ROM the firmware of the computer executes during the boot sequence of the computer; and
   executing at least a portion of the multi-image option ROM according to the option ROM dispatch policy during the boot sequence of the computer, wherein the device is an add-on device attached to the computer via a slot and the option ROM dispatch policy is associated with the device based at least in part on the option ROM dispatch policy being associated with the slot.

2. The computer-implemented method of claim 1 wherein the multi-image option ROM contains a Unified Extensible Firmware Interface (UEFI) option ROM image and a legacy option ROM image.

3. The computer-implemented method of claim 2 wherein the type setting of the option ROM dispatch policy indicates the UEFI option ROM image or the legacy option ROM image.

4. The computer-implemented method of claim 1 wherein the device belongs to a device group and the option ROM dispatch policy is associated with the device based at least in part on the device group.

5. The computer-implemented method of claim 1 wherein the device belongs to a device group and the option ROM dispatch policy associated with the device overrides a group option ROM dispatch policy associated with the device group to which the device belongs.

6. A computer-implemented method comprising:
   accessing an option read-only memory (ROM) dispatch policy setup token comprising a slot list identifying slots supporting add-on devices associated with respective multi-image option ROMs;
   determining an on-board device list by identifying on-board devices associated with respective multi-image option ROMs;
   accessing respective option ROM dispatch policies for the slots identified in the slot list and the identified on-board devices, the respective option ROM dispatch policies including:
      an enablement setting indicating whether firmware of the computer executes the respective multi-image option ROM associated with the on-board device or the add-on device during a boot sequence of the computer, and
      a type setting indicating an image of the multi-image option ROM the firmware of the computer executes during the boot sequence of the computer;
   rendering a main setup user interface, the main setup user interface including the on-board device list listing the on-board devices and the slot list listing the slots;
   receiving a user selection selecting one of the on-board devices or slots; and
   rendering a device setup user interface, the device setup user interface presenting options for modifying the respective option ROM dispatch policy of the selected one of the on-board devices or slots.

7. The computer-implemented method of claim 6 further comprising detecting a user action indicating a change to one of the presented options for modifying the respective option ROM dispatch policy of the selected one of the on-board devices or slots.

8. The computer-implemented method of claim 7 further comprising modifying the respective option ROM dispatch policy based at least in part on the user action.

9. The computer-implemented method of claim 6 wherein the options for modifying the respective option ROM dispatch policy include an option to modify the enablement setting.

10. The computer-implemented method of claim 6 wherein the options for modifying the respective option ROM dispatch policy include an option to modify the type setting.

11. The computer-implemented method of claim 6 wherein the respective multi-image option ROMs contain a Unified Extensible Firmware Interface (UEFI) option ROM image and a legacy option ROM image.

12. The computer-implemented method of claim 6 wherein rendering the main setup user interface includes rendering a description of the add-on devices.

13. A non-transitory computer-readable storage medium having computer-executable instructions stored thereupon which, when executed by a computer, cause the computer to:
   access an option read-only memory (ROM) dispatch policy setup token identifying a slot supporting an add-on device associated with a first multi-image option ROM;
   identify an on-board device associated with a second multi-image option ROM;
   access a first option ROM dispatch policy comprising:
      a first enablement setting indicating whether firmware of the computer executes the first multi-image option ROM during a boot sequence of the computer, and
      a first type setting indicating which image of the first multi-image option ROM the firmware of the computer executes during the boot sequence of the computer;
   access a second option ROM dispatch policy comprising:
      a second enablement setting indicating whether firmware of the computer executes the second multi-image option ROM during the boot sequence of the computer, and
      a second type setting indicating which image of the second multi-image option ROM the firmware of the computer executes during the boot sequence of the computer;
   render a main setup user interface, the main setup user interface providing for selection of the slot or the on-board device;
   receive a user selection indicating the slot or the on-board device; and
   render a device setup user interface, the device setup user interface presenting options for modifying the first option ROM dispatch policy when the user selection indicates the slot and the device setup user interface presenting options for modifying the second option ROM dispatch policy when the user selection indicates the on-board device.

14. The non-transitory computer-readable storage medium of claim 13 wherein the computer-executable instructions when executed by the computer, cause the computer to detect a user action indicating a change to the first option ROM dispatch policy or the second option ROM dispatch policy.

15. The non-transitory computer-readable storage medium of claim 14 wherein the computer-executable instructions when executed by the computer, cause the computer to modify the first option ROM dispatch policy or the second option ROM dispatch policy based at least in part on the user action.

16. The non-transitory computer-readable storage medium of claim 13 wherein the options for modifying the first option ROM dispatch policy include an option to modify the first enablement setting of the first option ROM dispatch policy.

17. The non-transitory computer-readable storage medium of claim 13 wherein the options for modifying the second option ROM dispatch policy include an option to modify the second type setting of the second option ROM dispatch policy.

18. The non-transitory computer-readable storage medium of claim 13 wherein the second multi-image option ROM contains a Unified Extensible Firmware Interface (UEFI) option ROM image and a legacy option ROM image.

19. The non-transitory computer-readable storage medium of claim 13 wherein rendering the main setup user interface includes rendering a description of the add-on device.

\* \* \* \* \*